United States Patent [19]

Kawagishi et al.

[11] Patent Number: 5,381,400
[45] Date of Patent: Jan. 10, 1995

[54] INFORMATION CARRIER, INFORMATION RECORDING AND/OR REPRODUCING APPARATUS, AND INFORMATION DETECTING APPARATUS

[75] Inventors: Hideyuki Kawagishi, Ayase; Toshihiko Miyazaki, Hiratsuka; Hisaaki Kawade, Yokohama; Etsuro Kishi, Kawasaki; Kiyoshi Takimoto, Isehara; Toshihiko Takeda, Atsugi, all of Japan

[73] Assignee: Canon Kabushiki Kaisha, Tokyo, Japan

[21] Appl. No.: 74,143

[22] Filed: Jun. 9, 1993

Related U.S. Application Data

[63] Continuation of Ser. No. 845,958, Mar. 4, 1992, abandoned.

[30] Foreign Application Priority Data

Mar. 8, 1991 [JP] Japan .................. 3-068989

[51] Int. Cl.⁶ .............................................. G11B 5/84
[52] U.S. Cl. ......................... 369/272; 369/275.5; 369/126
[58] Field of Search ............... 369/126, 262, 275.5, 369/272, 274, 75.1, 75.2, 72, 69, 71, 73, 74; 250/442.11, 306; 360/97.02, 98.03, 99.02, 133

[56] References Cited

U.S. PATENT DOCUMENTS

| | | | |
|---|---|---|---|
| 4,592,039 | 3/1986 | Toyoguchi et al. | 369/75.2 |
| 4,760,567 | 7/1988 | Crewe | 369/100 |

FOREIGN PATENT DOCUMENTS

| | | |
|---|---|---|
| 0394995 | 10/1990 | European Pat. Off. . |
| 63-161552 | 7/1988 | Japan . |
| 63-161553 | 7/1988 | Japan . |

OTHER PUBLICATIONS

G. Binning, et al., "Scanning tunneling Microscopy", Helvetica Physica Acta. vol. 55, pp. 726-735 (1982).

Primary Examiner—Paul M. Dzierzynski
Assistant Examiner—Don Wong
Attorney, Agent, or Firm—Fitzpatrick, Cella, Harper & Scinto

[57] ABSTRACT

An information carrier for performing information recording and/or reproducing through a probe provided in an information recording and/or reproducing apparatus includes an information recording medium having a recording plane for recording and/or reproducing through the probe, and a frame which is formed detachably in the information recording and/or reproducing apparatus to accommodate the information recording medium airtightly. A mechanism is provided in the frame which can be opened or closed to allow the recording plane of the information recording medium to be open when the frame is mounted in the information recording and/or reproducing apparatus. The recording plane of the information recording medium is allowed to face the probe through the opening caused by the mechanism, and this mechanism performs the opening in a closed space formed by the cooperation of the frame and the information recording and/or reproducing apparatus when the frame is mounted in the information recording and/or reproducing apparatus, thereby preventing the property degradation of the recording medium and the probe electrode as well as damage and adhesion of dust particles.

16 Claims, 4 Drawing Sheets

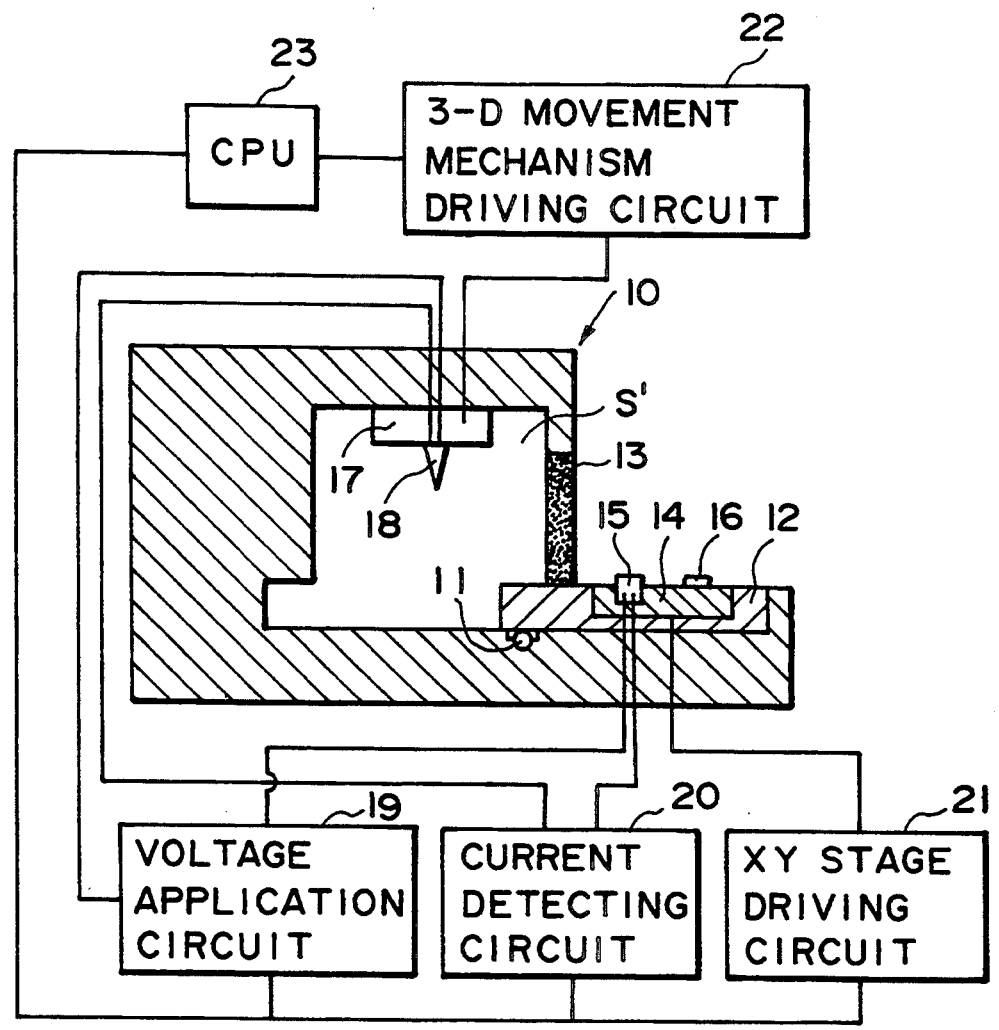
F I G. 3

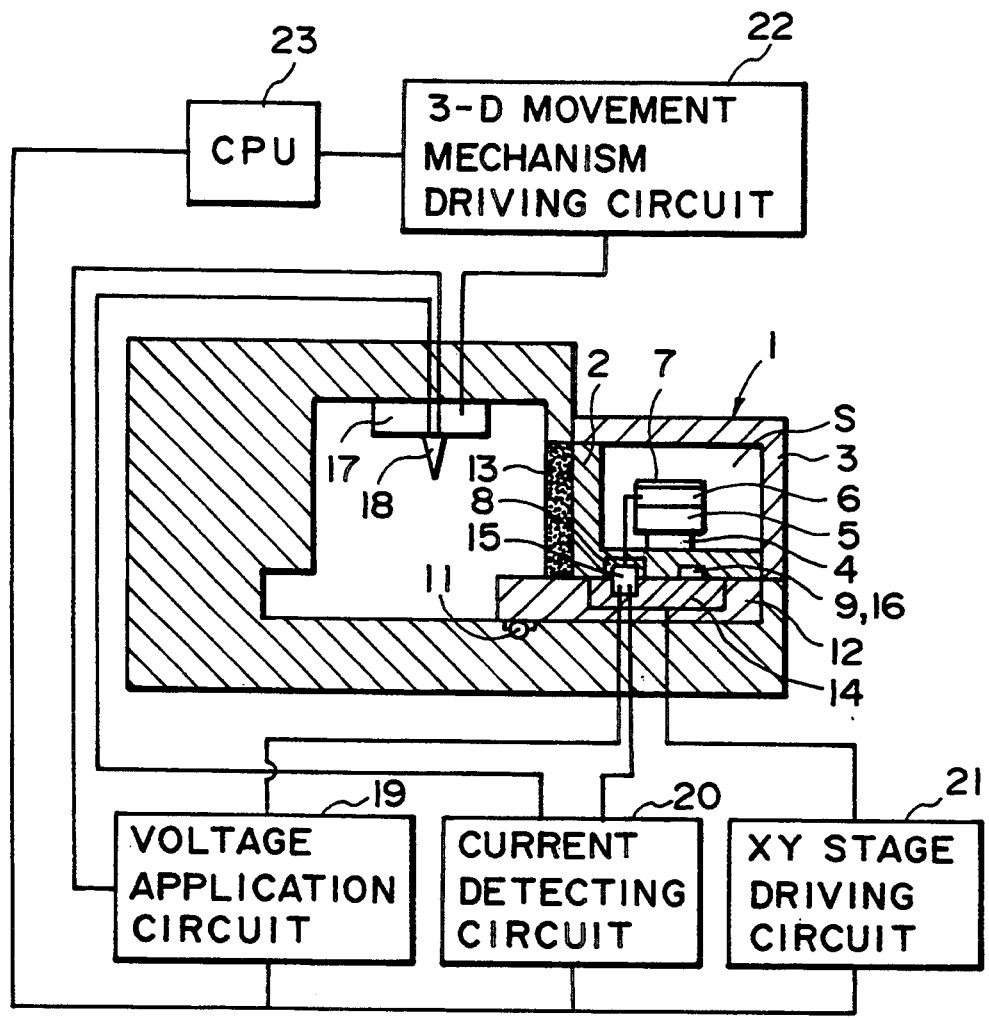
F I G. 4

INFORMATION CARRIER, INFORMATION RECORDING AND/OR REPRODUCING APPARATUS, AND INFORMATION DETECTING APPARATUS

This application is a continuation of application Ser. No. 07/845,958, filed Mar. 4, 1992, now abandoned.

BACKGROUND OF THE INVENTION

1. Field of the Invention

The present invention relates to an information carrier, an information recording and/or reproducing apparatus, and an information detecting apparatus.

2. Related Background Art

In recent years, there has been developed a scanning tunnel microscope (hereinafter referred to as STM) capable of observing directly the surface of a substance and the electronic structure in the vicinity of the surface [G. Binning et al., Helvetica Physica Acta. 55.726 (1982)], and it becomes possible to observe real space images with a high resolution irrespective of monocrystalline or non-crystalline. Furthermore, there is an advantage that the STM enables a measurement with low voltage while causing almost no damage to a testing material due to its electric current. Also, it can be operated not only in a super high vacuum but in the atmosphere or in a solution, and is applicable to various materials. Hence, its wide range applications are expected.

The STM utilizes a phenomenon that a tunnel current is generated when a metal probe and a conductive specimen are allowed to approach a distance of approximately 1 nm while a voltage is being applied between them. Recently, there have been many proposals put forward for the construction of information processing apparatuses mainly for super-high density recording and reproducing by the utilization of the STM principle such as disclosed in Japanese Patent Laid-Open Application No. 63-161552 and Japanese Patent Laid-Open Application No. 63-161553. In other words, with the probe electrode which corresponds to the STM probe, physical changes are given to a recording medium which corresponds to a specimen, or the electronic condition of the surface of a recording medium is changed to record information, and by the method of reproducing the recorded bit information by the tunnel current flowing between them, it will be possible to perform the recording and reproducing of large scale information in a high density of molecular or atomic order.

In this respect, as one of the above-mentioned recording methods, it is possible to produce holes on a recording medium such as graphite by the application of a pulse voltage in order to give physical deformation, aside from making dents by comprising an acute recording probe on a recording medium according to a recent report. In other words, after setting the probe electrode close to the surface of a recording medium, a voltage is applied between them at 3 to 8V with a pulse width of 1 to 100 μS, thereby to cause a hole of approximately 40 Å diameter to be formed, which is good enough to be used as a recording bit. On the other hand, in order to perform recording by changing the electronic states, there is a known method in which a deposit film of an appropriate organic molecule is formed on the base electrode by Langmuir-Blodgett's technique (hereinafter referred to as LB method) or the like, and a voltage is applied between the base electrode and probe electrode to change the electric resistance properties of the microscopic portion. Attention is given to this method because this method can easily perform erasing and rewriting.

However, in the conventional information recording carrier and information processing apparatus using such a carrier, the recording carrier and the surface of the probe electrode are always exposed to the atmosphere, and by the moisture in the atmosphere and others, there occurs property degradation due to elapsed time. Also, there is a possibility that dust particles in the atmosphere adhere to the probe electrode and recording medium to cause them to be damaged.

SUMMARY OF THE INVENTION

It is a first object of the present invention to provide an information carrier highly reliable in recording and reproducing and easy to handle by preventing the property degradation of the probe and the recording medium as well as adhesion of dust particles and possible damages, and an information processing apparatus.

The above-mentioned and other objects, features and advantages of the present invention will become more apparent by reference to the detailed description of the present invention set forth below.

BRIEF DESCRIPTION OF THE DRAWINGS

FIG. 3 is a view schematically showing the structure of an information processing apparatus before mounting the information recording carrier.

FIG. 4 is a view illustrating the state of the information recording carrier when it is mounted.

DETAILED DESCRIPTION OF THE PREFERRED EMBODIMENT

An embodiment set forth below is an information recording carrier having a recording medium airtightly contained in an airtight container which can freely be opened or closed, and an electrode which is connected to said recording medium and is exposed outside said airtight container.

Also, there is provided an information processing apparatus comprising holding means for holding the information recording carrier having an area which can freely be closed, a recording medium contained in a container which can freely be opened or closed, and a first electrode which is connected to the aforesaid recording medium and is exposed outside the container, a second electrode which is connected to the first electrode when the information recording medium is held, a probe electrode which is arranged in the area which can freely be closed, means for enabling the recording medium in the container of the information recording carrier, which is held by the holding means to be exposed in a state that the area which can freely be closed is closed, and means for performing recording to and/or reproducing from the recording medium by applying a voltage between the aforesaid probe electrode and the second electrode.

The information recording carrier structured as above enables a recording medium to be airtightly contained in the airtight container which can freely be opened or closed while the information processing apparatus enables a probe electrode to be airtightly set in the closed area which can freely be opened or closed. It is, therefore, possible to prevent the property degradation of the probe electrode, damage and dust particle adhesion.

Hereinafter, the present invention will be described in detail in accordance with an embodiment shown in FIG. 1 to FIG. 5.

Figure 1:
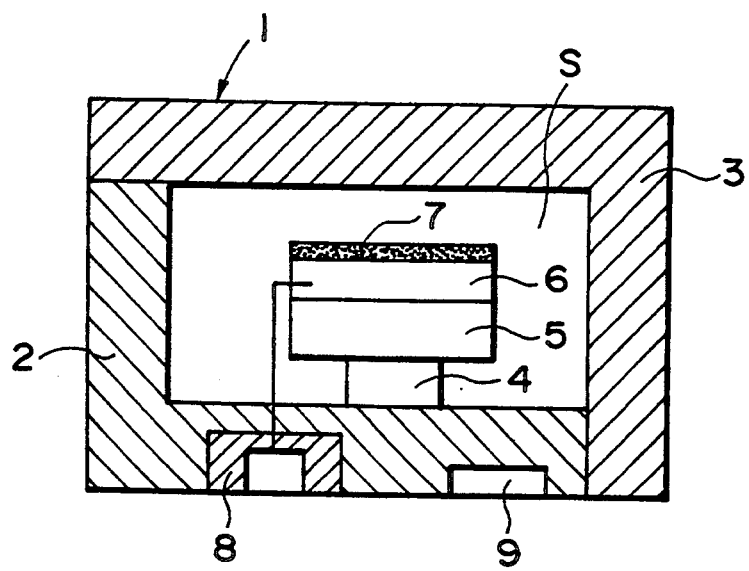
FIG. 1 is a cross-sectional view illustrating an information recording carrier.
Figure 2:
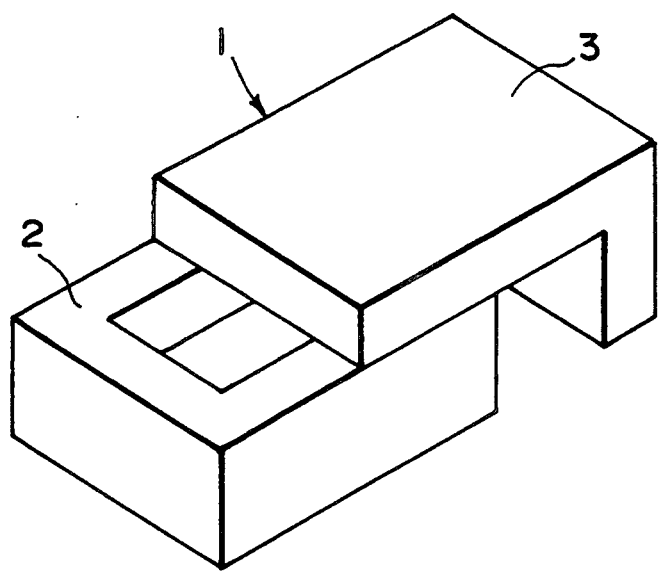
FIG. 2 is a perspective view illustrating the an information recording carrier.

FIG. 1 is a cross-sectional view illustrating an information recording carrier 1 according to an embodiment of the present invention. The information recording carrier 1 comprises a frame member 2 and a covering member 3 which is slidably provided with respect to the frame member 2 so as to be opened or closed freely as shown in FIG. 2, and the frame member 2 and the covering member 3 form a closed space S. On a shock absorbing mechanism 4 fixed on the frame member 2, a substrate 5, base electrode 6, and a recording medium 7 are mounted. These elements are contained in the closed space S. The shock absorbing mechanism 4 is connected to a carrier side contacting electrode 8 provide on the external bottom face of the frame member 2 so as to be exposed toward the outside. Further, on the external bottom face of the frame member 2, a concavity 9 is provided for fixing the information recording medium 1 to the information processing apparatus which will be describe later.

FIG. 3 is a cross-sectional view illustrating a state of the information processing apparatus 10 before the information recording carrier 1 is mounted. In the information processing apparatus 10, there is provided an X-Y stage 12 which can be moved by a roller 11 in the direction indicated by an arrow. On this X-Y stage 12, a window 13 which can freely be opened or closed, and a carrier mounting section 14 are fixed. In the carrier mounting section 14, an apparatus side contacting electrode 15 which makes the respective junctions with the carrier side contacting electrode 8 of the information medium 1 and the concavity 9, and a connector 16 are mounted. A closed space S' is formed by the X-Y stage 12 and window 13 in the information processing apparatus 10. A single or a plurality of probe electrodes 18 connected to a three dimensional movement mechanism 17 are arranged downward above the closed space S'. Also, a voltage application circuit 19 and a current detecting circuit 20 are connected to the apparatus side contacting electrode 15 and the probe electrode 18. An X-Y stage driving circuit 21 is connected to the X-Y stage 12, and a three dimensional movement mechanism driving circuit 22 is connected to the three dimensional movement mechanism 17. A CPU 23 provided for the overall control is connected to the voltage application circuit 19, current detecting circuit 20, X-Y stage driving circuit 21, and three dimensional movement driving circuit 22.

At the time of recording or reproducing information, the concavity 9 and the connector 16 are coupled as shown in FIG. 4 to cause the information recording carrier 1 to be fixedly held on the X-Y stage 12. Then, the carrier side contacting electrode 8 and the apparatus side contacting electrode 15 on the apparatus side are coupled, so that the voltage application circuit 19 and current detecting circuit 20 are connected to the base electrode 6. At this juncture, the information recording carrier 1 is held against the apparatus without any space so that the airtightness is maintained even when the window 13 is opened.

Figure 5:
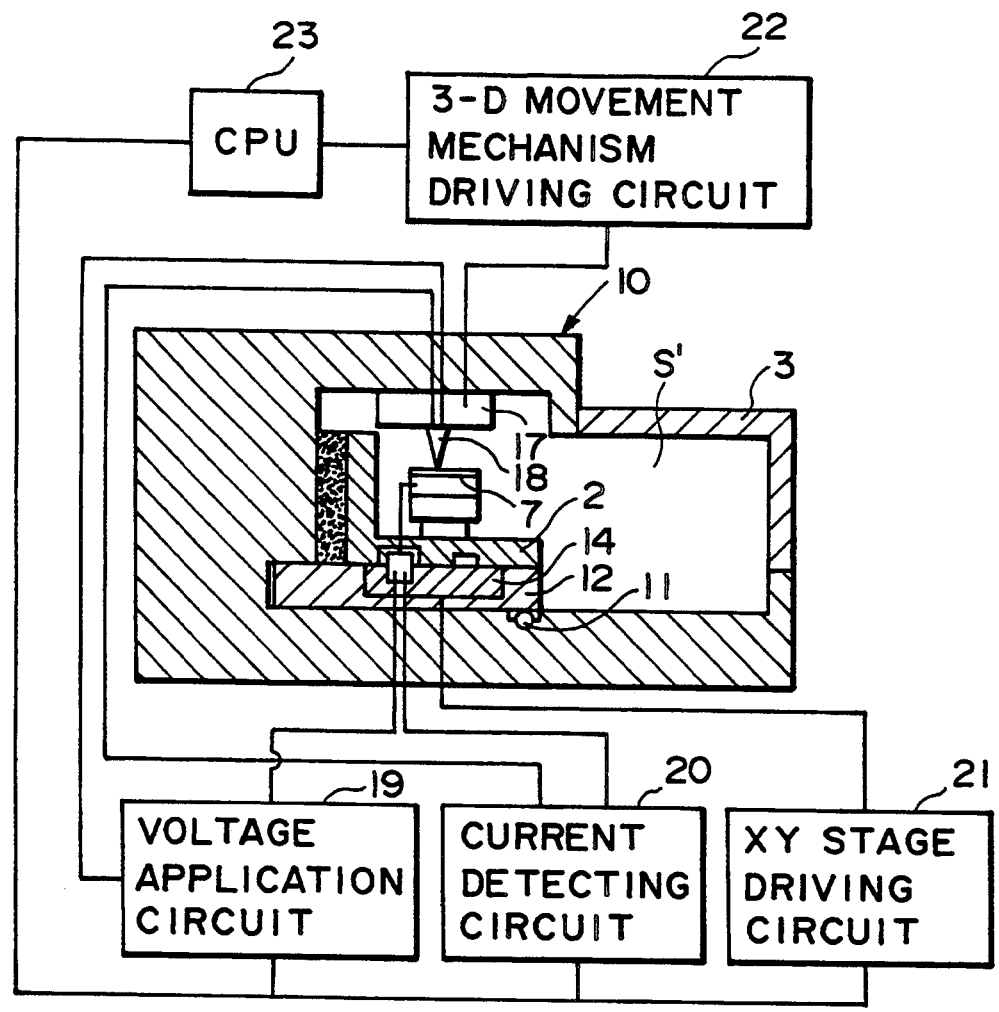
FIG. 5 is a view illustrating the state of the information recording carrier and information processing apparatus when an STM operation is performed.

Subsequently, the window 13 is opened and the X-Y stage 12 is moved by the X-Y stage driving circuit 21 in the left-hand direction. Then, as shown in FIG. 5, the frame member 2 is caused to slide with respect to the covering member 3, and the recording medium 7 is exposed in the closed space S'. The recording medium 7 is moved in the direction toward the location below the probe electrode 18, thereby completing the preparation. In this way, the recording medium 7 is introduced into the apparatus while the closed spaces S and S' are being shut from the outside air.

For the recording medium 7, it is possible to use various media such as disclosed in Japanese Patent Laid-Open Application No. 63-161552. In the present embodiment, a medium having four layers of sqalium-vis-6-aqualazulene (SOAZ) formed by Langmuir-Blodgett's technique (LB method) is used. In this case, if a rectangular pulse voltage of 3.5V with pulse width of 50 nS is applied between the recording medium 7 and the probe electrode 18 by the voltage application circuit 19 upon recording, the portions of the recording medium 7 where the voltage is applied are caused to make the conductivity changes. As a result, the portions having a lower electrical resistance are generated to perform the recording.

Upon reproducing, the tunnel current which is being generated by the application of d.c. voltage of 200 mV, for example, is detected by the current detecting circuit 20, and the three dimensional movement mechanism 17 is driven by the three dimensional movement mechanism driving circuit 22 to control the distance between the recording medium and the probe electrode so that this tunnel current becomes constant, for example, 0.1 nA on the average. At this juncture, the feed back driving amount in the vertical direction corresponds to the recorded information by the conductivity changes on the recording medium 7. Therefore, by the scanning of the probe electrode 18 on the recording medium 7, it is possible to reproduce the information (to perform an information detection). Also, it is possible to operate erasing by the application of a triangle wave pulse voltage of 5V with pulse width of 1 $\mu$S. In this respect, if a plurality of probe electrodes 18 are employed, its selection can be performed by the roller 11. Also, the recording and reproducing are not limited to a conductivity change of the kind, but its mode can be such that recording and reproducing are performed by forming bits of concavity and convexity on the recording medium.

Subsequent to the operation of the information recording and reproducing, the X-Y stage 12 is moved in the direction toward the right-hand side, and the information recording carrier 1 is removed after the closed space S has been restored. Therefore, there is no possibility that the recording medium 7 and the probe electrode 18 are exposed to the outside.

While the above-mentioned apparatus is an information recording and reproducing apparatus, it is needless to mention that the apparatus can be the one only for recording or for reproducing (information detection).

Now, the above-mentioned information recording carrier and the information processing apparatus using this carrier are as described above such that the information recording carrier enables a recording medium to be airtightly contained in the closed container which can freely be opened or closed while the information processing apparatus enables a probe electrode to be airtightly set in the closed area which can be freely opened or closed. Therefore, it is possible to prevent the property degradation of the recording medium and probe electrode, damages, and adhesion of dust particles as well as to make the handling of the information carrier easier and the reliability of recording and reproducing by the information processing apparatus improved.

What is claimed is:

1. An information carrier by which information recording and/or reproducing are performed through a probe provided in an information recording and/or reproducing apparatus, comprising:

an information recording medium for performing information recording and/or reproducing through said probe, said information recording medium having a recording plane; and a frame in which said information recording medium is airtightly contained, said frame being detachably mounted in said information recording and/or reproducing apparatus, said frame having a mechanism which is opened or closed to allow the recording plane of said information recording medium to be open when mounted in said information recording and/or reproducing apparatus, wherein the recording plane of said information recording medium faces said probe by opening of said mechanism, and said mechanism performs the opening in a closed space formed by cooperation of said frame and said information recording and/or reproducing apparatus when said frame is mounted in said information recording and/or reproducing apparatus.

2. An information carrier according to claim 1, wherein a contacting electrode is provided in said frame, and said contacting electrode is arranged at a position where the electrode is electrically connected to said information recording and/or reproducing apparatus when said frame is mounted in said information recording and/or reproducing apparatus.

3. An information carrier according to claim 2, wherein electrical signals for performing information recording and/or reproducing for said information recording medium are transmitted from said information recording and/or reproducing apparatus through said contacting electrode.

4. An information carrier according to claim 1, wherein said mechanism which can be opened or closed to close the recording plane of said information recording medium in a state where the closed space is shut from the outside air when said frame is removed from said information recording and/or reproducing apparatus.

5. An information carrier for information detection through a probe provided in an information detecting apparatus, comprising:

an article mounting section for mounting an article in which information is detected through said probe;

a frame for airtightly containing the article mounted on said article mounting section, said frame being detachably mounted to from said information detecting apparatus;

a mechanism which is opened or closed provided on said frame, said mechanism having a structure for causing the article mounted on said article mounting section to be opened when said frame is mounted on said information detecting apparatus, said article and said probe facing each other through the opening caused by said mechanism, and said mechanism performing the opening in a closed space formed by cooperation of said frame and said information detecting apparatus when said frame is mounted in said information detecting apparatus.

6. An information recording carrier including a recording medium by which information recording and/or reproducing are performed through a probe provided in an information recording and/or reproducing apparatus, said carrier comprising:

a recording medium by which information recording and/or reproducing are performed through said probe;

containing means for airtightly containing said recording medium and being detachably mounted to said information recording and/or reproducing apparatus, said containing means having a mechanism capable of being opened and closed while maintaining recording medium in an airtight state such that the mechanism permits opening on a recording plane of said recording medium when attached to said information recording and/or reproducing apparatus.

7. A carrier according to claim 6, further comprising a contacting electrode in said containing means, said contacting electrode being arranged in a position where it is electrically connected to said information recording and/or reproducing apparatus when said containing means is attached to said information recording and/or reproducing apparatus.

8. A carrier according to claim 7, wherein electrical signals for performing information recording and/or reproducing relative to said recording medium are transmitted from said information recording and/or reproducing apparatus through said contacting electrode.

9. A carrier according to claim 6, wherein said mechanism capable of being opened and closed permits closing on the recording plane of said recording medium when said containing means is removed from said information recording and/or reproducing apparatus.

10. A carrier according to claim 6, wherein said containing means forms a closed space in cooperation with said information recording and/or reproducing apparatus when said containing means is attached to said information recording and/or reproducing apparatus.

11. A carrier according to claim 10, wherein said recording medium and said probe are arranged within the closed space.

12. A carrier according to claim 6, wherein said probe is not contained in said containing means.

13. An information carrier by which information is detected through a probe provided in an information detecting apparatus, said carrier comprising:

an article mounting portion for mounting an article in which information is detected through said probe;

containing means for airtightly containing the article mounted on said article mounting portion and being detachably mounted to said information detecting apparatus, said containing means having a mechanism capable of being opened and closed while maintaining the recording medium in an airtight state such that the mechanism permits exposure of the article when attached to said information detecting apparatus.

14. A carrier according to claim 13, wherein said mechanism capable of being opened and closed permits closing of the article when said containing means is removed from said information detecting apparatus.

15. A carrier according to claim 13, wherein said containing means form a closed space in cooperation with said information detecting apparatus when said containing means is attached to said information detecting apparatus.

16. A carrier according to claim 15, wherein the article and said probe are arranged within the closed space.

* * * * *

UNITED STATES PATENT AND TRADEMARK OFFICE
CERTIFICATE OF CORRECTION

PATENT NO. : 5,381,400
DATED : January 10, 1995
INVENTOR(S) : Kawagishi et al.

It is certified that error appears in the above-indentified patent and that said Letters Patent is hereby corrected as shown below:

Title Page:
[56] REFERENCES CITED:

U.S. PATENT DOCUMENTS, 4,592,039  3/1986  Toyoguchi et al." should read --4,592,039  5/1986  Toyoguchi et al.--.

OTHER PUBLICATIONS, "G. Binning," should read --G. Binnig--.

COLUMN 1:

Line 20, "Binning" should read --Binnig--.

COLUMN 5:

Line 62, delete "from".
Line 67, "opened" should read --open--.

COLUMN 6:

Line 21, "recording" should read --the recording--.

Signed and Sealed this

Eleventh Day of July, 1995

Attest:

BRUCE LEHMAN

*Attesting Officer*     *Commissioner of Patents and Trademarks*